(12) United States Patent
Forbes et al.

(10) Patent No.: US 7,699,393 B2
(45) Date of Patent: Apr. 20, 2010

(54) LOAD LIMITING (ENERGY MANAGEMENT) CHILD RESTRAINT SEAT

(75) Inventors: William Cameron Forbes, Springboro, OH (US); Kent Newbright, Miamisburg, OH (US)

(73) Assignee: Evenflo Company Inc., Miamisburg, OH (US)

( * ) Notice: Subject to any disclaimer, the term of this patent is extended or adjusted under 35 U.S.C. 154(b) by 0 days.

(21) Appl. No.: 12/286,902

(22) Filed: Oct. 2, 2008

(65) Prior Publication Data

US 2009/0102253 A1 Apr. 23, 2009

Related U.S. Application Data

(60) Provisional application No. 60/997,509, filed on Oct. 3, 2007.

(51) Int. Cl.
*B60N 2/42* (2006.01)
*A47D 15/00* (2006.01)

(52) U.S. Cl. .............. 297/216.11; 297/250.1

(58) Field of Classification Search ........... 297/216.11, 297/250.1, 219.12, 216.1
See application file for complete search history.

(56) References Cited

U.S. PATENT DOCUMENTS

| | | | |
|---|---|---|---|
| 4,215,900 A * | 8/1980 | Coult | 297/254 |
| 4,402,548 A | 9/1983 | Mason | |
| 4,461,510 A | 7/1984 | Cunningham et al. | |
| 4,687,255 A | 8/1987 | Klanner et al. | |
| 4,790,601 A | 12/1988 | Burleigh et al. | |
| 4,854,639 A | 8/1989 | Burleigh et al. | |
| 5,110,182 A | 5/1992 | Beauvais | |
| 5,125,718 A | 6/1992 | Czernakowski et al. | |
| 5,127,120 A * | 7/1992 | Mason | 5/655 |
| 5,228,746 A | 7/1993 | Burleigh | |
| 5,409,294 A | 4/1995 | Czernakowski | |
| 5,466,044 A | 11/1995 | Barley et al. | |
| 5,487,588 A | 1/1996 | Burleigh et al. | |
| 5,524,965 A | 6/1996 | Barley | |
| 5,551,751 A | 9/1996 | Sedlack et al. | |
| 5,567,007 A | 10/1996 | Czernakowski et al. | |
| 5,611,596 A | 3/1997 | Barley et al. | |
| 5,664,830 A * | 9/1997 | Garcia et al. | 297/216.11 |
| 5,722,719 A | 3/1998 | Glomstad | |
| 5,722,720 A | 3/1998 | Lumley | |
| 5,842,737 A | 12/1998 | Goor | |
| 5,845,968 A | 12/1998 | Lovic | |
| 5,887,944 A | 3/1999 | Boost | |

(Continued)

OTHER PUBLICATIONS

Author Unknown, Baby Safety Capsule, Feb. 24, 2007, 2 pgs, www.powerhousemuseum.com/australia_innovates.

(Continued)

*Primary Examiner*—Milton Nelson, Jr.
(74) *Attorney, Agent, or Firm*—Taft Stettinius & Hollister LLP (57) ABSTRACT

A child restraint seat which changes the position of the occupant and dissipates kinetic energy during a collision. An exemplary embodiment rearward-facing child restraint seat shifts the occupant to translate forward and/or move from a relatively reclined position to a relatively upright position during a vehicular collision. Additionally, some of the kinetic energy of the occupant is dissipated through the use of an energy absorbing element, which limits loading on the occupant.

11 Claims, 9 Drawing Sheets

U.S. PATENT DOCUMENTS

| | | |
|---|---|---|
| 5,954,397 A | 9/1999 | Czernakowski et al. |
| 6,082,819 A | 7/2000 | Jackson |
| 6,135,553 A | 10/2000 | Lovic et al. |
| 6,152,525 A | 11/2000 | Carine et al. |
| 6,206,470 B1 | 3/2001 | Baloga et al. |
| 6,209,957 B1 | 4/2001 | Baloga et al. |
| 6,439,660 B1 | 8/2002 | Guenther |
| 6,634,708 B2 | 10/2003 | Guenther |
| 6,739,661 B1 | 5/2004 | Dukes |
| 7,044,549 B2 | 5/2006 | Maier et al. |
| 7,219,958 B2 * | 5/2007 | Yamazaki et al. ...... 297/256.13 |
| 2002/0060483 A1 | 5/2002 | Yoshida et al. |

OTHER PUBLICATIONS

Author Unknown, Baby Capsules—A Product Service System (PSS), Jan. 15, 2005, 1 pg, removed from internet, source unknown.

Author Unknown, Baby Safety Capsule (abstract), date unknown, 1 pg, removed from internet, source unknown.

Author Unknown, Baby Safety Capsule (advertisement), date unknown, 2 pgs, Holden Retailer, removed from internet, source unknown.

Author Unknown, Baby Capsule and Child Safety Seat Hire, Jul. 1, 2006, 2 pgs, Canterbury City Council advertisement, removed from internet, source unknown.

* cited by examiner

LOAD LIMITING (ENERGY MANAGEMENT) CHILD RESTRAINT SEAT

CROSS-REFERENCE TO RELATED APPLICATION

This application is a continuation of and claims priority under 35 U.S.C. §120 from U.S. Provisional Application No. 60/997,509, filed Oct. 3, 2007, the disclosure of which is herein incorporated by reference.

FIELD OF THE INVENTION

The present invention relates to a child restraint seat for use in a vehicle. Child restraint seats, also known as car seats, are generally designed to be secured to the seat of an automobile. They are also frequently used in other vehicles such as aircraft and typically include seating surfaces with attached straps and buckles adapted to safely restrain an infant or child in the seat. The present invention particularly relates to a child restraint seat that dissipates energy and reduces the loading on the child. This is accomplished by changing the position of the occupant child relative to the vehicle if the vehicle in which the child restraint seat is mounted is involved in a collision. More specifically, the invention relates to mechanisms for use in connection with a child restraint seat that limits the crash loads on the child during a collision and corresponding mechanisms that dissipate energy and reposition the child during a collision.

Child restraint seats that change the position of the occupant during a collision are known. Specifically, forward-facing child restraint seats which move the child from an upright position to a reclined position during a collision are known. See, for example, U.S. Pat. No. 5,722,719 to Glomstad. Seats of this type are designed to reduce the risk of injuries due to whiplash of the head and neck as well as internal injuries due to the pressure of seatbelts on internal organs. Other known forward-facing child restraint seats elevate both the front and rear portions of the seat during a frontal collision, e.g., U.S. Pat. No. 5,110,182, and rotate about a pivot point during a collision, e.g., U.S. Pat. Nos. 5,842,737 and 6,439,660.

Additionally, rearward-facing child seats which reposition the child from a relatively reclined position to a relatively upright position during a collision are known. See, for example, U.S. Pat. No. 5,551,751. Seats of this type are designed to allow infants and children to normally ride in a more comfortable reclined position while placing them in a generally safer and more upright position during a crash.

Generally, it is desirable to dissipate some of the kinetic energy of the child within the child restraint seat as the child changes position during a crash. Prior art seats have used rotary brakes, buffers, and springs to accomplish this task.

BRIEF SUMMARY OF THE INVENTION

According to the present invention, a child restraint seat having improved features is provided. An exemplary embodiment includes a rearward-facing seat carriage which changes position during a collision, a seat mounting mechanism including rods which slide within slots in the base to produce translation, either with or without simultaneous rotation of the seat carriage, and a damping mechanism to dissipate kinetic energy and limit occupant loads during a collision.

In a first aspect, the present invention child restraint seat may include a base adapted to be secured within a passenger compartment of a vehicle, the vehicle having a forward direction, a rearward direction and a seat carriage adapted to support and restrain a child, the seat carriage being movably coupled with the base such that the child faces rearward when the restraint seat is installed in the vehicle, wherein the seat carriage is adapted to simultaneously translate forward relative to the base and rotate about a horizontal axis extending laterally with respect to the forward and rearward directions of the vehicle during a sudden decrease in forward velocity of the vehicle.

In another embodiment of the first aspect, the child restraint seat may further include a plurality of slots and a plurality of rods slidably engaged with the slots, wherein the plurality of slots are affixed to one of the base and the seat carriage, the plurality of rods are affixed to the other of the base and the seat carriage, and movement of the seat carriage relative to the base causes the rods to slide within the slots. The plurality of slots may include straight slots and may include a pair of parallel slots. The plurality of slots may further include a second pair of parallel slots, the second pair of parallel slots not being parallel with the first pair of parallel slots.

An embodiment of the first aspect may include a damper mechanically coupled to the seat carriage and the base such that translation and/or rotation of the seat carriage relative to the base is opposed by the damper. The damper may be one of a hydraulic damper and a pneumatic damper. The damper may be rigidly connected to the base and connected to the seat carriage by a length of webbing. The damper may also be rigidly connected to both the seat and the base. The damper may be extended or collapsed as the carriage translates and rotates during the sudden decrease in forward velocity of the vehicle.

In a second aspect, the child restraint seat of the present invention may include a base adapted to be secured within a passenger compartment of a vehicle, the vehicle having a forward direction and a rearward direction, a seat carriage adapted to support and restrain a child, the seat carriage being movably coupled with the base component, and a damper mechanically coupled to the seat carriage and the base such that movement of the seat carriage relative to the base is opposed by the damper.

In an embodiment of the second aspect, the damper may be one of a hydraulic damper and a pneumatic damper. The damper may be rigidly connected to the base and connected to the seat carriage by a length of webbing. The damper may also be rigidly connected to both the seat and the base. The damper may be extended or collapsed as the seat carriage moves relative to the base.

In another embodiment of the second aspect, the seat carriage may be adapted to simultaneously translate forward relative to the base and rotate about a horizontal axis extending laterally with respect to the forward and rearward directions of the vehicle during a sudden decrease in forward velocity of the vehicle. The child restraint seat may further include a plurality of slots and a plurality of rods slidably engaged with the slots such that slots are affixed to the base or the seat carriage, the plurality of rods are affixed to the other of the base and the seat carriage, and movement of the seat carriage relative to the base causes the rods to slide within the slots. The plurality of slots may include straight slots and may include a pair of parallel slots. The plurality of slots may further include a second pair of parallel slots, the second pair of parallel slots not being parallel with the first pair of parallel slots. Additionally, the seat carriage may be arranged such that the child faces rearward when the restraint seat is installed in the vehicle.

In a third aspect, the present invention child restraint seat may include a base adapted to be secured within a passenger compartment of a vehicle, the vehicle having a forward direction and a rearward direction, a seat carriage adapted to support and restrain a child, the seat carriage being movably coupled with the base such that the child faces rearward when the restraint seat is installed in the vehicle, and a damper mechanically coupled to the seat carriage and the base wherein the seat carriage is adapted to simultaneously translate forward relative to the base and rotate about a horizontal axis extending laterally with respect to the forward and rearward directions of the vehicle during a sudden decrease in forward velocity of the vehicle and wherein at least one of the translation and rotation of the seat carriage relative to the base is opposed by the damper or energy absorbing element.

In an embodiment of the third aspect, the child restraint seat may include a plurality of slots and a plurality of rods slidably engaged with the slots wherein the plurality of slots are affixed to one of the base and the seat carriage, the plurality of rods are affixed to the other of the base and the seat carriage and movement of the seat carriage relative to the base causes the rods to slide within the slots.

Other features and advantages of the present invention will become apparent to those skilled in the art upon consideration of the following detailed description of preferred embodiments exemplifying the best mode of carrying out the invention as presently perceived. The drawings are only to serve for reference and illustrative purposes, and are not intended to limit the scope of the invention.

BRIEF DESCRIPTION OF THE SEVERAL VIEWS OF THE DRAWINGS

The detailed description particularly refers to the accompanying Figures in which.

DETAILED DESCRIPTION OF THE INVENTION

Figure 2:
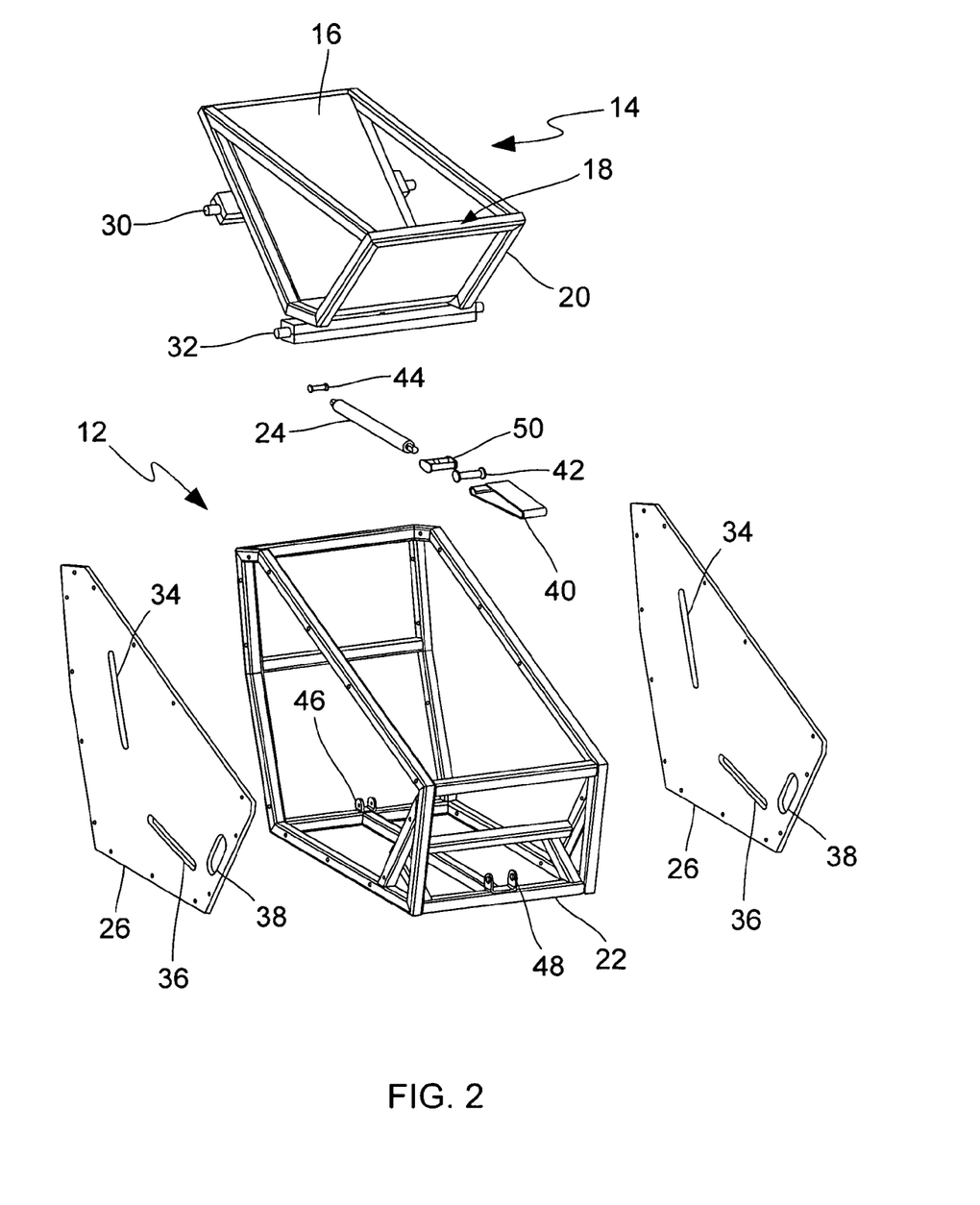
FIG. 2 is a front isometric exploded view of an exemplary embodiment of a child restraint seat in accordance with the present invention.

As shown in the appended drawings described above, the present invention is comprised of a child restraint seat 10. As depicted in FIG. 2, child restraint seat 10 preferably includes a base 12 and a seat carriage 14. The base 12 includes a base frame 22, a damper 24, and side panels 26. The base frame 22 is adapted to be placed on a vehicle seat and provides a means for attaching the child restraint seat 10 to the vehicle as well as providing support for the seat carriage 14.

During a vehicle crash, an energy absorbing element slows the velocity of the seat carriage 14 relative to the base 12 as described in further detail below. In the exemplary embodiment, the energy absorbing element is a damper 24 is comprised of a hydraulic damper. The hydraulic damper operates by pushing oil through internal orifices as its shaft is extended. It is within the scope of the invention to utilize one or more of other types of dampers, including pneumatic damping mechanisms. It is also within the scope of the invention to incorporate more than one damper. Multiple dampers may be arranged such that the dampers are actuated simultaneously and/or one after another.

In the exemplary embodiment, one end of the damper 24 is rigidly attached to the base 12 at mounting point 46 using pin 44. The other end of the damper 24 is coupled to the seat carriage 14 using a tether strap 40 made of nylon webbing. The webbing 40 attaches to the damper 24 using connector 50. The webbing 40 extends to mounting point 48 on base frame 22, where it passes around pin 42. The webbing 40 extends from the pin 42 to seat carriage 14, to which it attaches adjacent to rod 32 beneath the seat frame. For purposes of clarity, it is noted that the forward direction of the seat is toward mounting point 46 and the rearward direction of the seat is toward mounting point 48.

It is within the scope of the invention to attach the damper 24 to the seat carriage 14 using other means. For example, another type of flexible connector (e.g., a cable or a cord) may be used. In addition, it is within the scope of the invention to rigidly affix the damper 24 to both the base 12 and the seat carriage 14.

In the exemplary embodiment, side panels 26 each include an upper slot 34 and a lower slot 36 used to slidably couple the base 12 to the seat carriage 14 as described below. Slots 34, 36 are straight slots, meaning that the long edges of any one slot 34, 36 are generally parallel and linear. The two slots 34 associated with the upper rod 30, one on each side panel 26, are parallel with each other. Similarly, the two slots 36 associated with the lower rod 32, one on each side panel 26, are parallel with each other. Slots 34 are not parallel with slots 36 in order to cause the desired simultaneous rotation and translation of the seat carriage 14 during a vehicle crash as described below. The side panels 26 also include slots 38 through which a vehicle seatbelt may be run to secure the child restraint seat 10 to a seat in a vehicle. It is within the scope of the invention to utilize other means of coupling the child restraint seat 10 to the vehicle.

In the exemplary embodiment, the base frame 22 is constructed of segments of metal tubing, however, it is within the scope of the invention to construct all or part of the base 12 from other materials. In particular, the base frame 22 and side panels 26 may be molded of plastic and may be monolithically integrated. The side panels need not cover a substantial portion of the sides of the seat carriage 14. In addition, it is within the scope of the invention to utilize more or fewer slots 34, 36, 38 and slots 34, 36, 38 may be comprised of separate components affixed to the side panels 26 or the base frame 22.

The seat carriage 14 preferably includes a seat back 16, a seating surface 18, and seat frame 20. Affixed to the seat frame 20 are upper rod 30 and lower rod 32. The rods extend laterally wider than seat frame 20 such that they extend into slots 34, 36 on the side panels 26. In the exemplary embodiment, the seat frame 20 is constructed of metal tubing and the rods 30, 32 are cylindrical metal rods. However, it is within the scope of the invention to utilize other materials for the various components of the seat carriage 14. In particular, the seat frame 20 may be molded of plastic and may be monolithically integrated with the seat back 16 and/or the seating surface 18. In addition, it is within the scope of the invention to construct the rods 30, 32 from other materials, including molded plastic. Further, it is within the scope of the invention to include more or fewer rods. Additionally, the rods 30, 32 may be shortened such that they do not extend the entire lateral distance from one side panel 26 to the other side panel 26.

Although not shown in the drawings to enhance clarity, the seat back 16 and seating surface 18, as well as other user-accessible surfaces, may be covered with padding, fabric, and/or another soft covering. Additionally, a harness assembly including webbing, straps, buckles, and/or connectors is preferably mounted to the seat so as to permit securing a child in the seat carriage 14.

Further, the seat carriage 14 may include a releasably attached child carrier. In such an embodiment, the child carrier may include the seat back 16 and seating surface 18 as well as the soft covering and/or the harness assembly. The child carrier may releasably couple with the seat frame 20 such that, when attached, the child carrier and the seat frame 20 form the seat carriage 14.

In operation, the seat is preferably placed on a vehicle seat such that child will face to the rear of the vehicle (i.e., the seat back 16 is toward the front of the vehicle and the seating surface 18 is toward the rear of the vehicle). The base 12 is attached to the vehicle using means commonly known in the art, such as the vehicle lap belt, tethers, etc.

Figure 1:
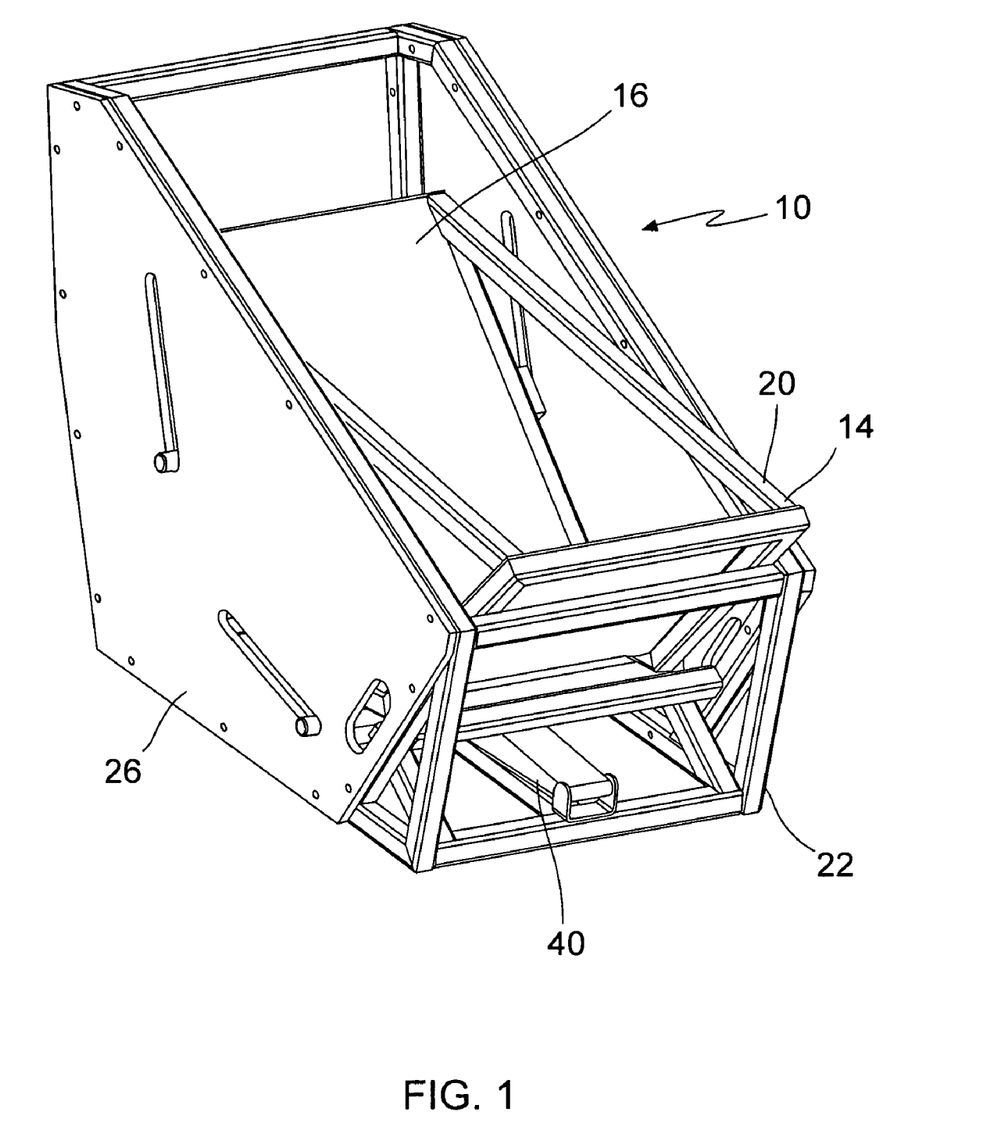
FIG. 1 is a front isometric view of an exemplary embodiment of a child restraint seat according to the present invention.
Figure 3:
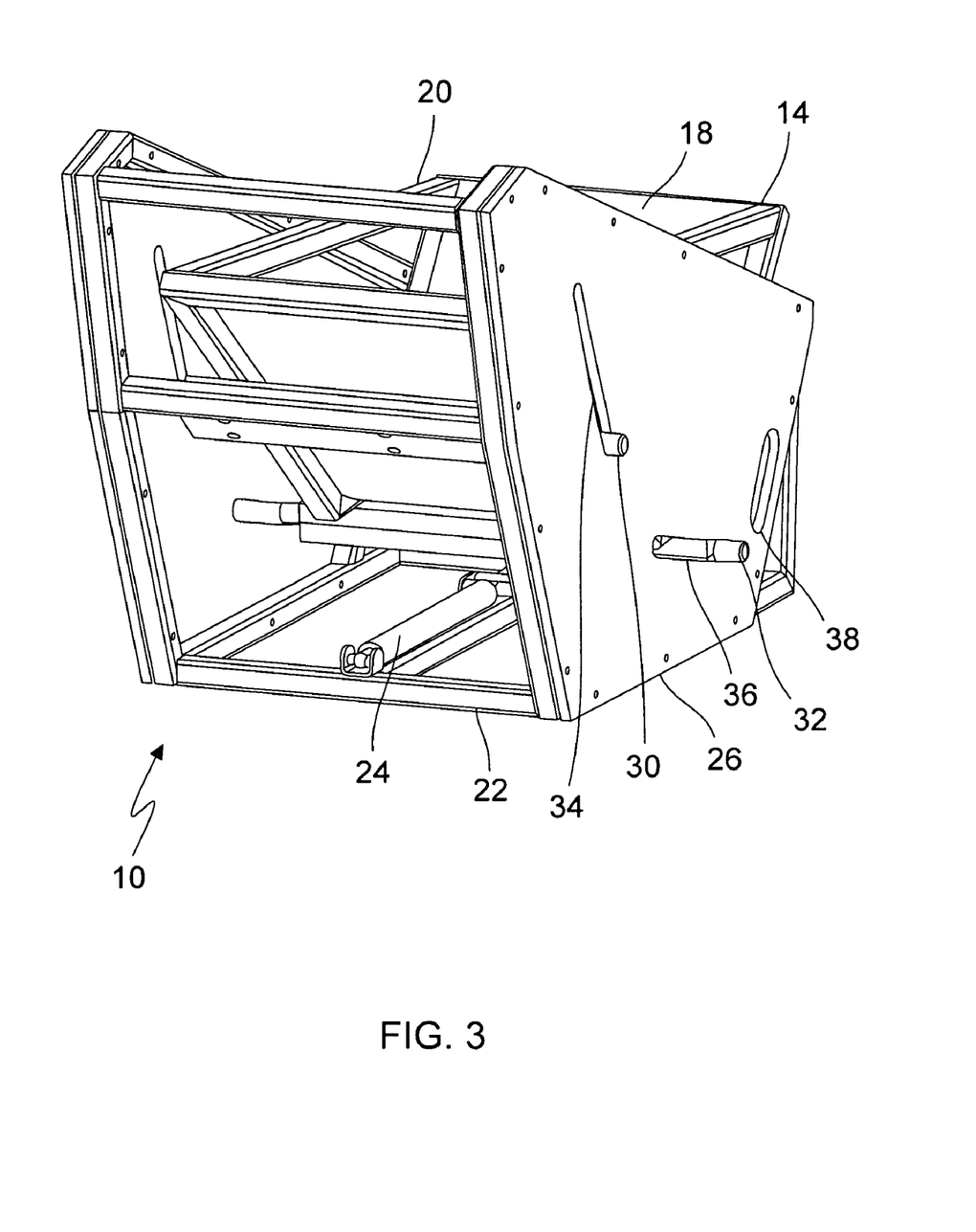
FIG. 3 is a rear isometric view of an exemplary embodiment of a child restraint seat in accordance with the present invention.
Figure 4:
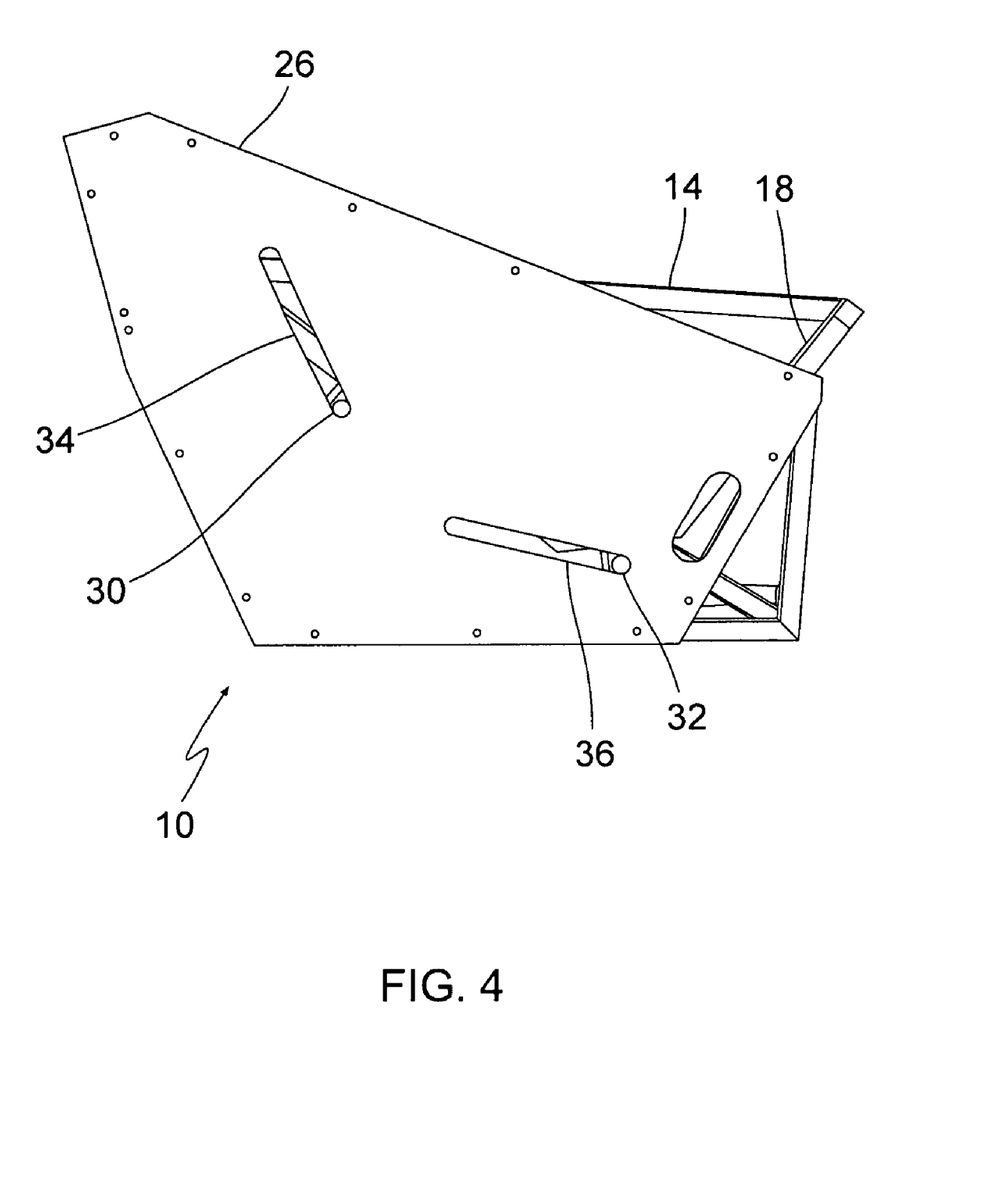
FIG. 4 is a side elevation view of an exemplary embodiment of a child restraint seat in accordance with the present invention.
Figure 5:
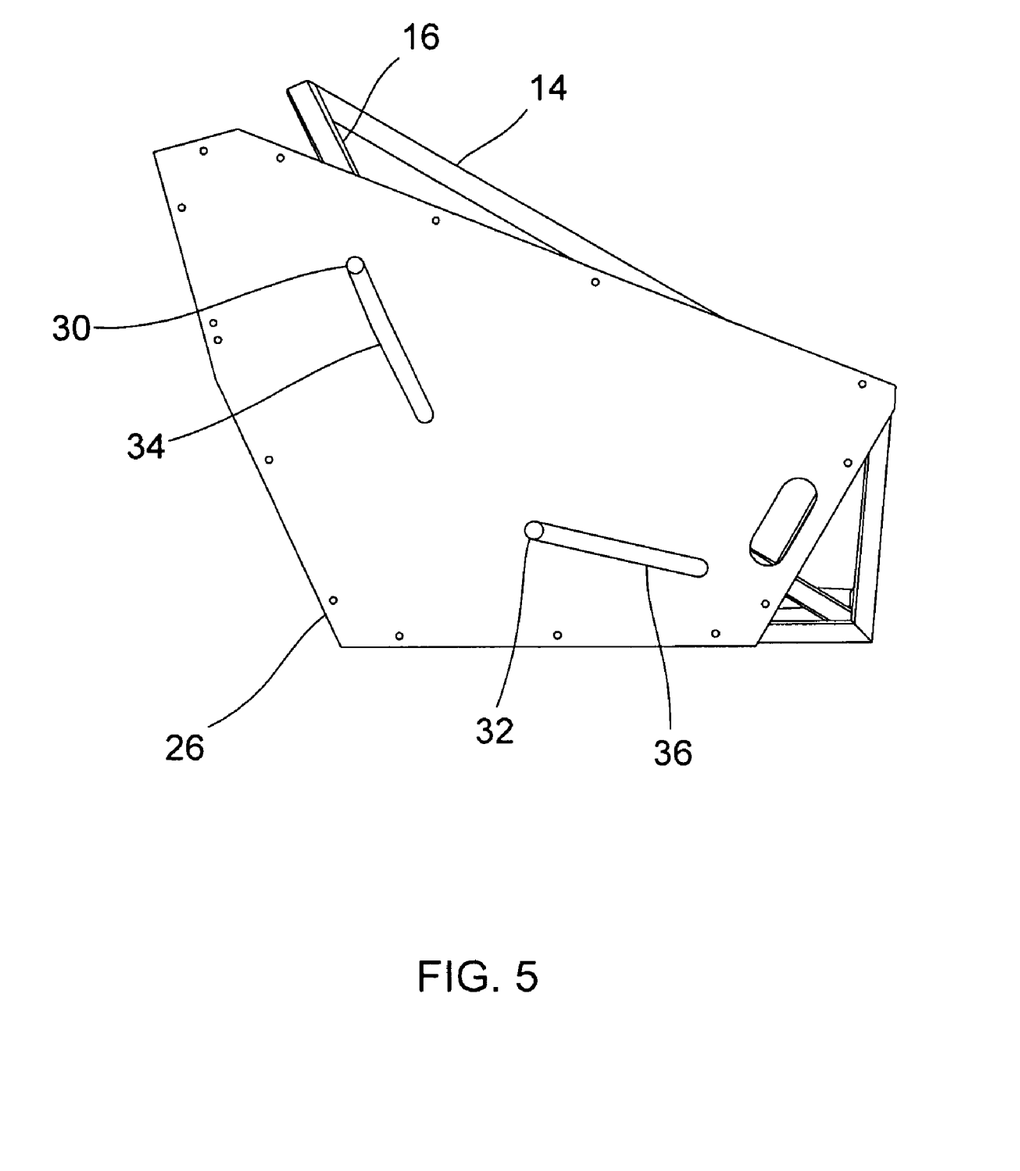
FIG. 5 is a side elevation view of an exemplary embodiment of a child restraint seat in accordance with the present invention with the seat carriage depicted in the post-crash position.

Initially, the relative positions of the seat carriage 14 and base assembly 12 are as shown in FIGS. 1, 3, and 4: the seat carriage 14 is in a relatively reclined position and the rods 30, 32 are in the lowest and rear-most positions in the slots 34, 36. Under normal conditions, the seat carriage 14 remains in this position relative to the base assembly 12 and the damper 24 remains in its initial collapsed configuration. A child can be placed in the seat assembly (upper body on the seat back 16 and lower body on the seating surface 18), secured using the harness assembly, and removed when the trip is complete.

In the event of a frontal collision of the vehicle, the seat operates to change the position and orientation of the seat carriage 14 relative to the base assembly 12. First, the inertia of the child due to the pre-crash forward speed of the vehicle causes the child to exert a force on the seat carriage 14 in a generally forward direction as the vehicle's forward motion slows. The child exerts this force both through her contact with the seat back 16 and, depending on the particular angle at which the seat is installed in the vehicle and the geometry of the collision, through the harness assembly, particularly the shoulder straps. This force in the generally forward direction causes the seat carriage 14 to move in the forward direction. Because the rods 30, 32 are rigidly affixed to the seat carriage 14 and the motion of the rods 30, 32 is limited by the slots 34, 36, the forward motion causes the seat carriage 14 to rotate from the initial reclined position to a more upright position as it translates forward.

Additionally, as the seat carriage 14 moves forward and to a more upright position during a crash, the seat carriage 14 pulls on the tether strap 40. The tether strap 40 connects to the damper mechanism 24 via pin 42. Thus, some of the generally forward force due to the inertia of the child is transmitted by the tether strap 40 to the damper 24. As the tension force in the tether strap 40 causes the damper mechanism 24 to extend, the damper mechanism 24 dissipates some of the kinetic energy of the child. Thus, the damper 24 operates to slow the movement of the seat assembly 14 from the relatively reclined initial position to the relatively upright crash position. In short, crash loads on the occupant are limited by allowing the relative motion between the seat carriage 14 and the base assembly 12 because the relative motion allows the use of an energy absorbing element such as the damper 24. Additionally, in the design collision, the damper 24 operates to oppose the translation and rotation of the seat carriage 14 relative to the base 12 such that the rods 30, 32 never reach the upper and forward ends of slots 34, 36. In the exemplary embodiment, springs opposing the extension of the damper 24 return it to its original collapsed configuration following a crash.

It is also within the scope of the invention to reverse the mounting of the above-described components such that the rods 30, 32 are affixed to the base assembly 12 and the slots 34, 36 are included on the seat carriage 14. Additionally, it is within the scope of the invention to provide a mounting mechanism which permits adjustment of the initial pre-crash orientation and/or position of the seat carriage 14 relative to the base 12.

It is within the scope of the invention for the seat carriage 14 to translate (without substantial rotation) or to rotate (without substantial translation) relative to the base assembly 12 in the event of a vehicle crash. The crash load reductions on the occupant may be achieved by using an energy absorbing element that relies on translation, rotation, or both.

The child restraint seat 10 may be adapted to be mounted in a vehicle such that the child faces the vehicle's forward direction. In such an embodiment, the seat carriage 14 may translate and/or rotate in the event of a frontal collision. Such an embodiment may include any of the energy absorption or dissipation devices described herein.

Alternative energy absorbing elements may be used in place of or in addition to the damper 24 described above. Such alternative means may include, but are not limited to, energy absorbing elements that absorb energy by being, for example, crushed, bent, or extended. Such elements may include, but are not limited to, honeycomb structures (such as, but not limited to, aluminum or plastic) and foams (such as, but not limited to, polymers such as, but not limited to, urethane) which may be crushed during a collision, metal wires which may be bent during a collision, and plastically deformable torsion bars which may be deformed during a collision. In general, any device capable of absorbing or dissipating the kinetic energy of the seat carriage 14 may be substituted for the damper described above. These devices may be single-use or reusable. One of skill in the art will understand that such alternative energy absorbing elements may require alternative structures for coupling the energy absorbing elements to the seat carriage 14 and base assembly 12.

A wire bending energy absorbing element may include a single or multiple straight wires of same or varying lengths contained within a channel or tube. Access to those wire(s) may be gained through an opening in the tube or channel in which the wire(s) would be connected to moveable carriage via a strap wrapped around the wire(s) with the other end connected to carriage, or through a direct mechanism permanently mounted to carriage that would envelope said wires. During a frontal impact collision, the carriage may move and pull the wire(s) thru the opening in the tube or channel. When pulled through the opening, the wire(s) may deform as they come out of the opening. This deformation dissipates kinetic energy and slows the movement of the carriage. Such a wire-bending embodiment may include the slots and rods described above.

A foam crushing energy absorbing element may be placed between carriage back and rear of seat base. When a frontal impact occurs, the moveable carriage tends to move towards the impact. In doing so, the carriage may crush the energy absorbing foam, thereby dissipating kinetic energy and slowing the carriage. Such a foam-crushing embodiment may include the slots and rods described above.

It is within the scope of the invention to utilize alternative connection mechanisms permitting limited relative motion between the seat assembly 14 and the base assembly 12. For example, mechanical linkages may be used in place of or in addition to the slots and rods described above. FIGS. 6-9 depict an exemplary embodiment of such a device. In this exemplary embodiment, the mechanical linkages may comprise four bar linkage mechanisms. While embodiments utilizing alternative connection mechanisms may include any of the energy absorbing elements described here, this exemplary embodiment incorporates a plastically deformable torsion bar 160.

Figure 6:
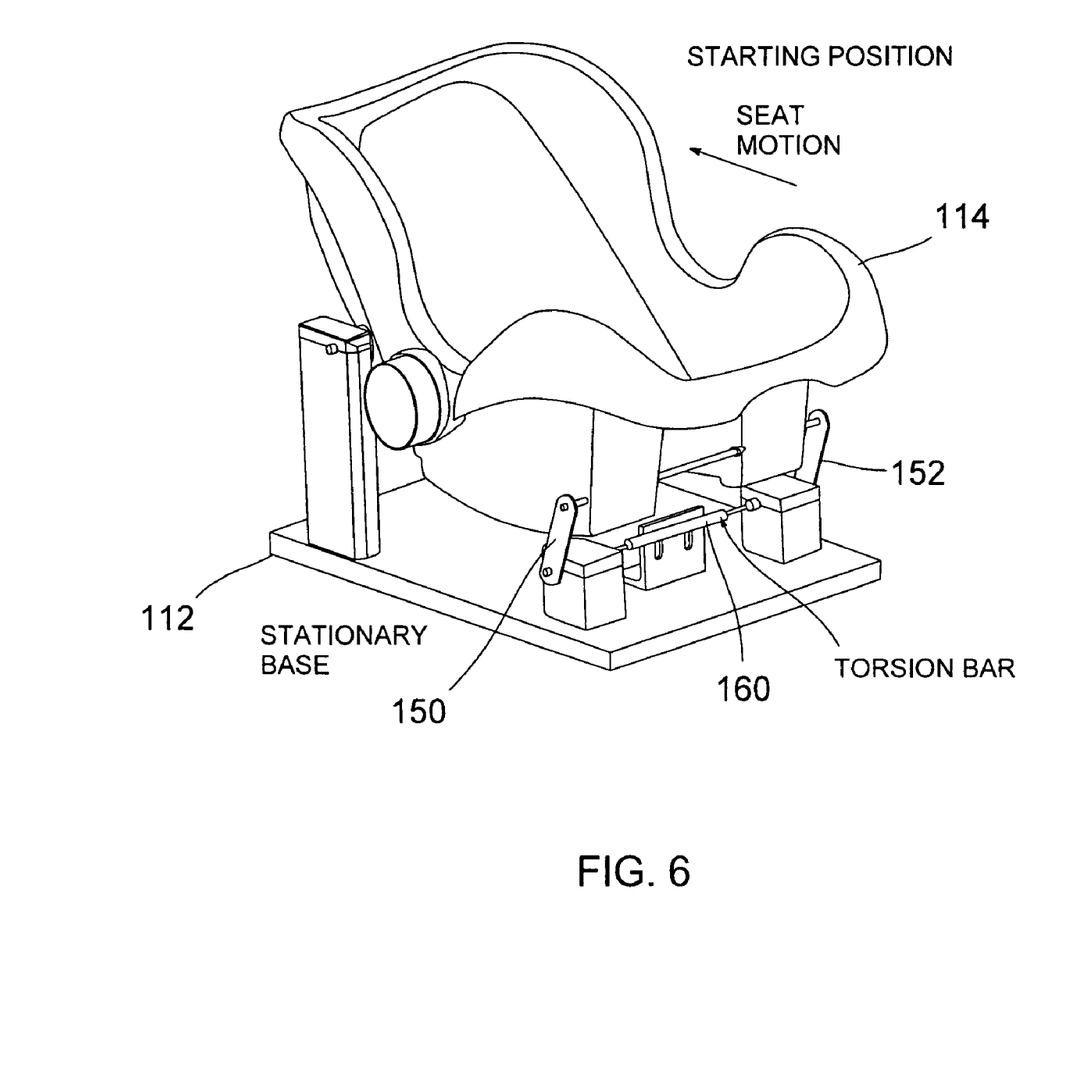
FIG. 6 is a perspective view of an alternative exemplary embodiment of a child restraint seat according to the present invention in a pre-crash position.
Figure 7:
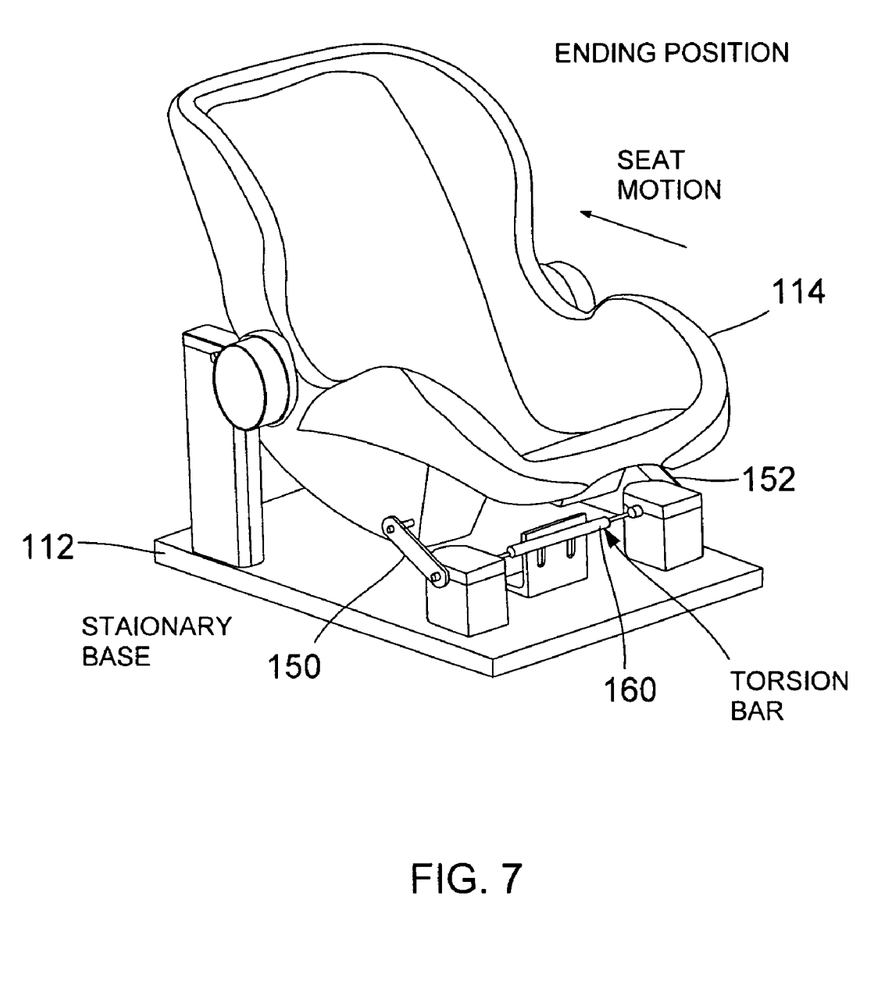
FIG. 7 is a perspective view of an alternative exemplary embodiment of a child restraint seat according to the present invention in a post-crash position.

Turning to FIGS. 6 and 7, seat carriage 114 is coupled to base assembly 112 by 4 linkages, two forward linkages 150, 152 and two rear linkages 154. Each linkage 150, 152, 154 is rotatable relative to the base assembly 112 and relative to the seat carriage 114, such that the linkages 150, 154 on one side, the seat carriage 114, and the base assembly 112 form a 4-bar linkage mechanism. As is well known in the mechanical arts, varying the relative lengths of each bar in the 4-bar linkage results in different rotational and translational motion. In the exemplary embodiment, the seat carriage 114 rotates and translates as is depicted in FIGS. 8-9.

Figure 8:
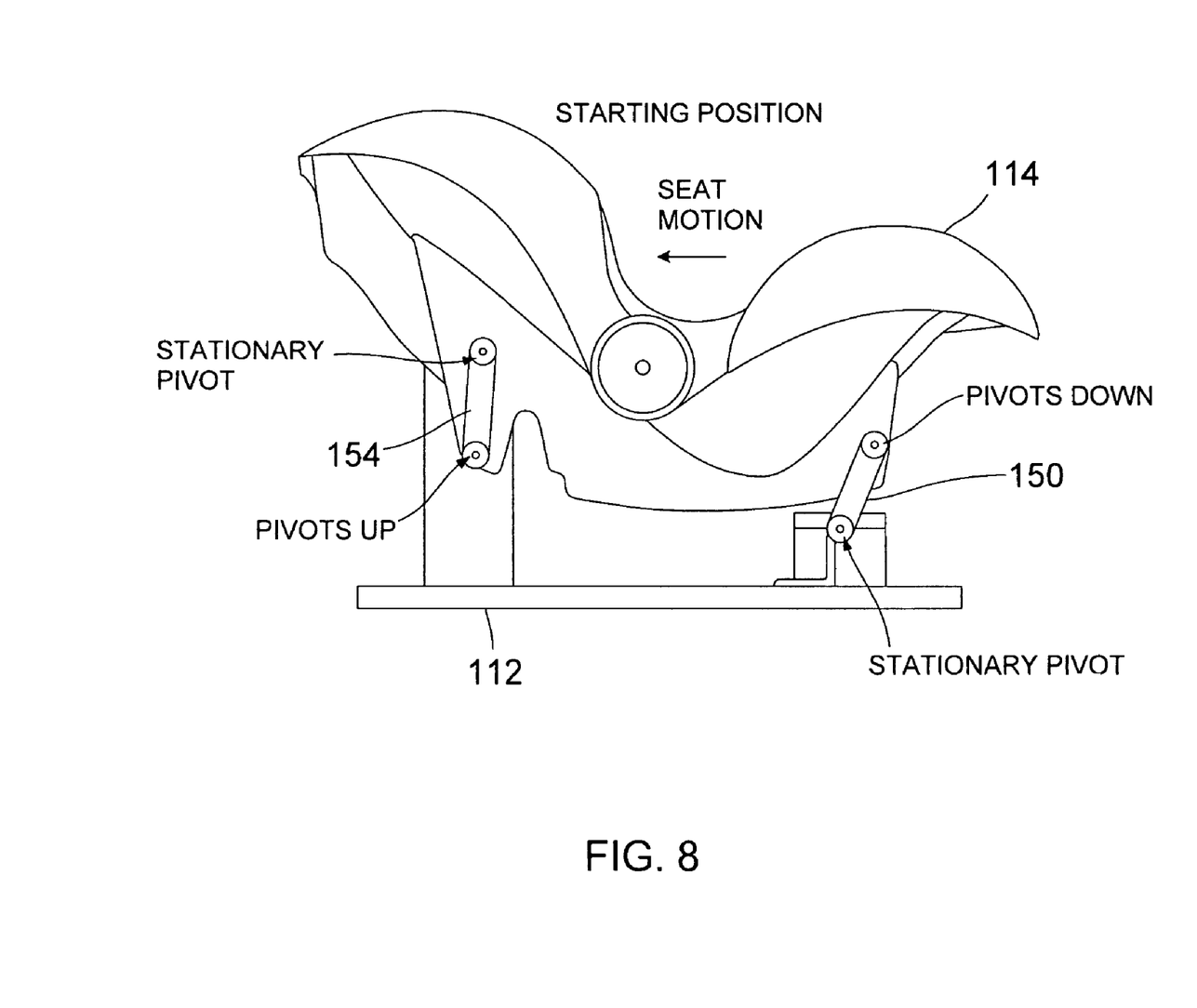
FIG. 8 is an elevation view of an alternative exemplary embodiment of a child restraint seat according to the present invention in a pre-crash position.

FIG. 8 shows the seat carriage 114 in the pre-crash starting position. Notably, in this exemplary embodiment, the end of the seat carriage 114 nearest linkage 154 is oriented towards the front of the vehicle in the exemplary embodiment; however, it is within the scope of the invention to utilize alternative connection mechanisms in forward or rearward facing child restraint seats.

Figure 9:
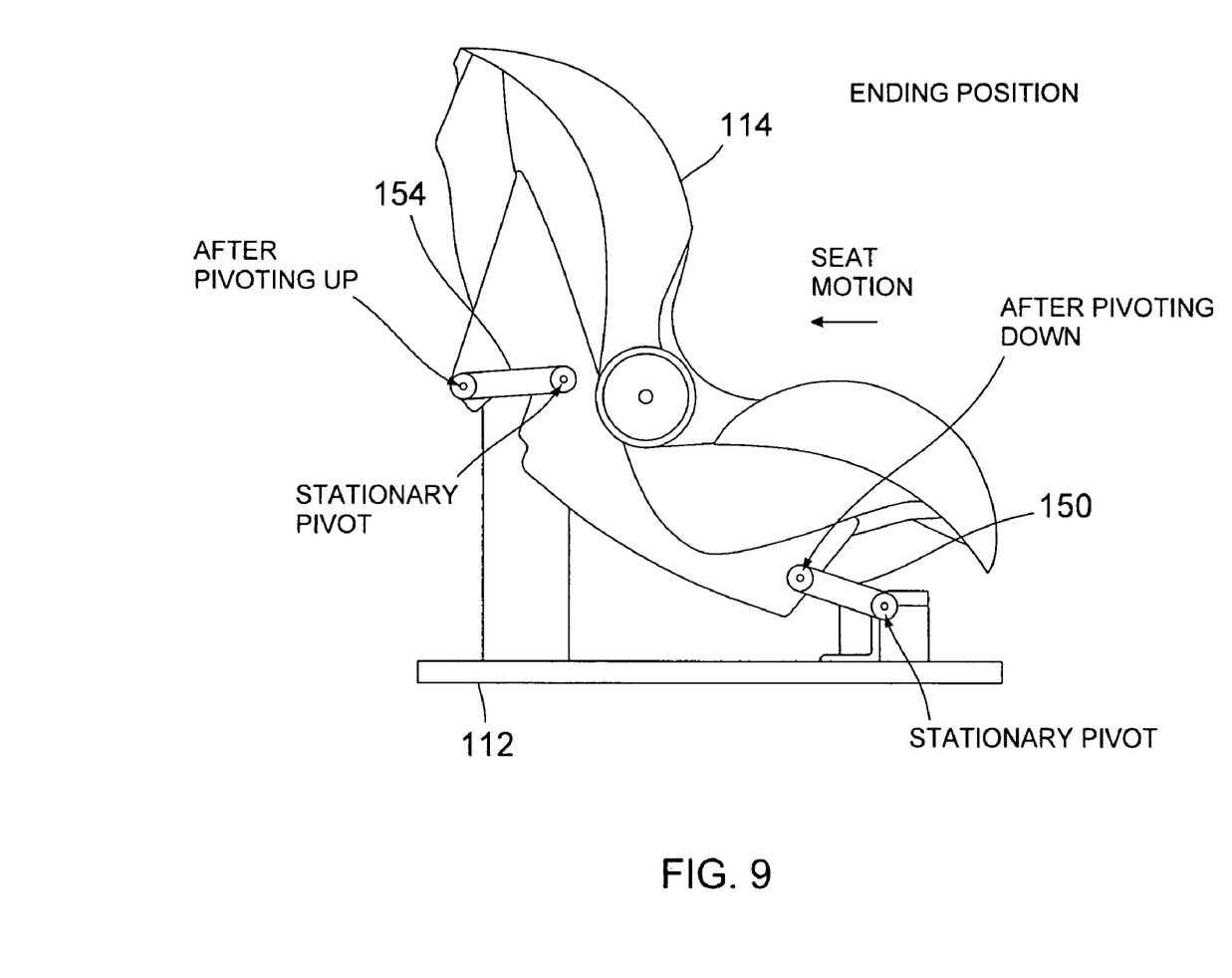
FIG. 9 is an elevation view of an alternative exemplary embodiment of a child restraint seat according to the present invention in a post-crash position.

In the event of a frontal collision, the inertia of the seat carriage 114 causes it to rotate and translate into the position shown in FIG. 9, the post-crash ending position. Linkages 150, 154 rotate counter-clockwise during a crash. Linkages 150, 152 are coupled to torsion bar 160 such that rotation of linkages, 150, 152 causes the torsion bar 160 to experience torsional loading. Torsion bar 160 is adapted to plastically deform as seat carriage 114 rotates and translates during a crash. This plastic deformation absorbs some of the energy resulting from the crash, thus limiting the crash loads on an occupant of the seat carriage 114.

While a preferred embodiment of the invention has been set forth above for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

The invention claimed is:

1. A child restraint seat comprising:
   a base adapted to be secured within a passenger compartment of a vehicle, the vehicle having a forward direction and a rearward direction;
   a seat carriage adapted to support and restrain a child, the seat carriage being movably coupled with the base;
   an energy absorbing element mechanically coupled to the base and the seat carriage such that the energy absorbing element opposes motion of the seat carriage relative to the base, wherein the energy absorbing element is at least one of a hydraulic damper, pneumatic damper, honeycomb structure, foam, torsion bar, and wire;
   a plurality of slots; and
   a plurality of rods slidably engaged with the slots;
   wherein the seat carriage is adapted to simultaneously translate forward relative to the base and rotate about a horizontal axis extending laterally with respect to the forward and rearward directions of the vehicle during a sudden decrease in forward velocity of the vehicle; and
   wherein the plurality of slots are affixed to one of the base and the seat carriage, the plurality of rods are affixed to the other of the base and the seat carriage, and movement of the seat carriage relative to the base causes the rods to slide within the slots.

2. The child restraint seat of claim 1, wherein the plurality of slots includes straight slots.

3. The child restraint seat of claim 2, wherein the plurality of slots includes a first pair of parallel slots.

4. The child restraint seat of claim 3, wherein the plurality of slots includes a second pair of parallel slots, the second pair of parallel slots not being parallel with the first pair of parallel slots.

5. The child restraint seat of claim 4, wherein the seat carriage is oriented such that the child faces forward when the restraint seat is installed in the vehicle.

6. The child restraint seat of claim 4, wherein the seat carriage is oriented such that the child faces rearward when the restraint seat is installed in the vehicle.

7. The child restraint seat of claim 4, wherein the seat carriage includes a releasably attached child carrier.

8. A child restraint seat comprising:
   a base adapted to be secured within a passenger compartment of a vehicle, the vehicle having a forward direction and a rearward direction;
   a seat carriage adapted to support and restrain a child carrier, the seat carriage being movably coupled with the base, wherein the seat carriage is oriented such that the child faces rearward when the restraint seat is installed in the vehicle;
   an energy absorbing element mechanically coupled to each of the seat carriage and the base, wherein the energy absorbing element is at least one of a hydraulic damper, pneumatic damper, honeycomb structure, foam, torsion bar, and wire;
   a plurality of slots; and
   a plurality of rods slidably engaged with the slots;
   wherein movement of the seat carriage relative to the base is opposed by the energy absorbing element; and
   wherein the plurality of slots are affixed to one of the base and the seat carriage, the plurality of rods are affixed to the other of the base and the seat carriage and movement of the seat carriage relative to the base causes the rods to slide within the slots.

9. The child restraint seat of claim 8, wherein the energy absorbing element is a hydraulic damper.

10. The child restraint seat of claim 9, wherein the hydraulic damper is rigidly affixed to the base and the other end of the damper is connected to the seat carriage by a length of webbing.

11. The child restraint seat of claim 9, wherein the hydraulic damper is extended as the seat carriage moves relative to the base.

* * * * *